April 6, 1965  A. E. KLOUDA  3,176,884
MATERIAL UNLOADER WITH END GATE
Filed July 3, 1961
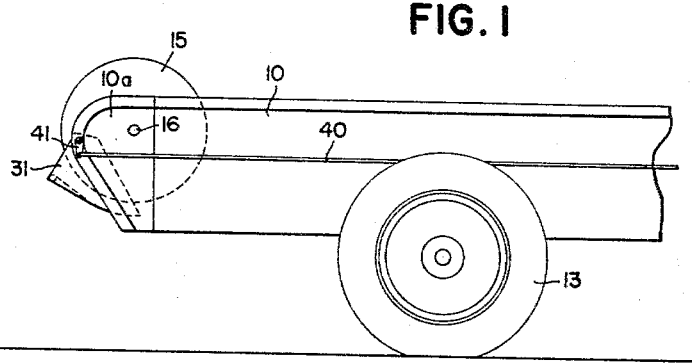
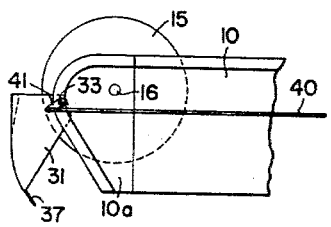
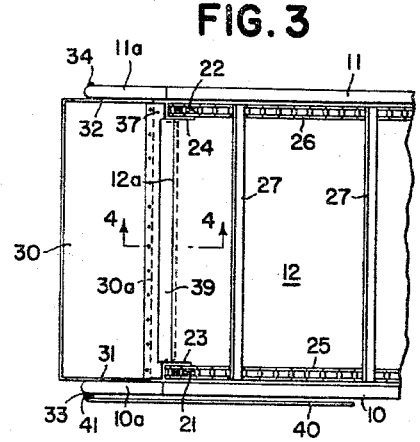
INVENTOR.
ALVIN E. KLOUDA
BY William A. Murray
ATTORNEY 3,176,884
MATERIAL UNLOADER WITH END GATE
Alvin E. Klouda, Moline, Ill., assignor to Deere & Company, Moline, Ill., a corporation of Delaware
Filed July 3, 1961, Ser. No. 121,682
14 Claims. (Cl. 222—263)

This invention relates to a material unloader and more particularly to an end gate attachment for a material unloader which operates to seal the end of the unloader from losing liquid in the material container of the unloader.

An object of the invention is to incorporate on a conventional type material unloader, which in the present instance will be a manure spreader, an end gate that will prevent a liquid type material from leaking out the open end of the material container. In the conventional type of manure spreader there is provided a mobile frame supporting a material contianer having upright side walls interconnected at their lower edges by a laterally disposed floor. The material container is normally closed at the forward end and is open at the rear end to permit discharge of material. Also provided adjacent the rear end and connected to the upright side walls is a material distributing rotor which feeds or breaks up material being fed through the rear open end. In handling manure, there is often times carried in the material container a liquid type of material which is desired to be retained in the container while the material is being transported to the field or to the place of discharge. There have been various methods proposed and provided for sealing the open rear end of the material container so that the liquid would not drip or flow out of the container. However, most seals have not operated properly due primarily to the fact that in a manure spreader there is provided a floor conveyor which has an upper run disposed above the floor of the box and a lower run disposed beneath the floor of the box. Flights on the conveyor must normally pass around the rear edge of the floor and consequently it is difficult to provide a seal at the open rear end of the manure spreader due to interference with the floor.

Specifically, it is proposed, and is the object of the present invention to provide an end gate having a transverse arcuate shaped panel adapted to swing from a position closely adjacent the rear edge of the floor to a position spacedly rearward of the rear edge of the floor. The rubber or flexible panel will yield upon the flights passing over the rear edge. In combination with the flexible element on the floor there is provided a forwardly directed flexible element on the forward edge of the end gate normally underlying the flexible panel on the rear edge of the floor to thereby seal liquid within the material box. The end gate is pivotally mounted on the side walls of the container so that material may be fed over the rear or upper edge by the rotor structure. Consequently in normal operation of the manure spreader, the material will flow over the upper edge of the end gate while at the same time the flexible panels will permit the flights to pass since they will yield upon the pressure of the flights passing between them. Consequently the seal between the flexible panels is generally retained except for the momentary passage of the chain flights.

It is also an object of the present invention to provide an end gate arcuate shaped and positioned on the rear underside of the rotor structure. The end gate is pivotally mounted on the side walls considerably rearwardly of the pivot for the rotor distributor so that even if the end gate is swung rearwardly to provide an opening between the rear edge of the floor and the end gate, the upper edge of the end gate will retain a relatively low position in relation to the rotor structure. Consequently the rotor structure may continue to feed material over the upper edge of the end gate even though the end gate is in its open position.

Other objects and advantages of the present invention will become apparent to those skilled in the art as the nature of the invention is better understood from the following description and as shown in the accompanying drawings.

FIG. 1 is a side view of a rear portion of a material unloader.

FIG. 2 is a side view of a rear portion of the material container with the end gate being shown in its open position.

FIG. 3 is a plan view of the rear portion of the material container with the rotor structure removed for purposes of showing underlying structure.

FIG. 4 is a sectional view taken substantially along the line 4—4 of FIG. 3.

Referring now to the drawings, the material unloader includes a material container or box having upright elongated sides 10, 11 interconnected at the lower edges by a laterally disposed floor 12. The container or box is conventionally closed at its forward end and is left open at its rearward end for the purpose of discharging material. The material container is normally carried in a mobile fashion by means of transversely spaced support wheels 13. The side walls 10, 11 normally extend slightly rearwardly of the floor 12 as indicated by rearward extensions 10a, 11a. Carried on the extensions 10a, 11a is a transverse rotor and distributing structure 15 including a rotor shaft 16 disposed in a transverse horizontal position so that the lower portion of the rotor 15 lies adjacent to the rear edge of the floor 12, the rear edge being indicated by the reference numeral 12a.

A transverse horizontal sprocket shaft 20 extends across the box directly beneath the rear edge 12a of the floor 12 and is carried on the side walls 10, 11. A pair of transversely spaced sprockets 21, 22 is carried on the shaft 20 adjacent the walls 10, 11. A similar sprocket arrangement is provided adjacent the forward end of the material container. The floor 12 has recessed sections 23, 24 so that transversely spaced chains 25, 26 may extend over the respective sprockets 21, 22. The chains 25, 26 form part of a floor conveyor and are interconnected transverse angle iron flights 27. As may be seen from viewing FIG. 4, the raddle type conveyor is so disposed as to have an upper run positioned above the floor 12 and a lower run positioned beneath the floor 12. The manure spreader, as of this point, has been described only in general terms. Generally it may be any of a series of conventional type spreaders. Should a more detailed description of the drive mechanism as well as the spreader be desired, such may be had by referring to U.S. Patent 3,014,729, issued to Messrs. E. A. Henningson and A. E. Klouda December 26, 1961.

An end gate attachment is provided adjacent the rear open end of the material container or box. The end gate attachment is composed of an arcuate shaped panel 30 which extends across the open rear end of the box, and a pair of upright side panels 31, 32 positioned inwardly and closely adjacent to the respective side wall extensions 10a, 11a. The end panels or walls 31, 32 are pivotally mounted on the rear edge of the extensions 10a, 11a by means of a pair of pivot pins 33, 34. The pins 33, 34 are transversely alined and provide a second transverse pivot which is positioned, relative to the transverse shaft 16 of the rotor 15, rearwardly and downwardly. As may be seen from viewing FIGS. 1 and 2, the upper edge of the arcuate shaped panel 30 is normally positioned so that material will pass over the rear upper edge of the panel 30. Also, it will be noted that the arcuate panel 30 is positioned spacedly from the rotor 15 so that material may pass between the rotor and the arcuate panel.

The panel 30 is provided with a lower transverse edge 30a. Mounted, by bolt and nut combinations 36, to the lower edge and extending forwardly therefrom is a flexible or rubber panel 37 which may, when the end gate is at its lower or forward position, extend in the direction of the floor 12. Fixed to the underside of the floor 12 adjacent its rear edge 12a, and by means of a nut and bolt combinations 38, is a rearwardly directed laterally disposed flexible or rubber panel 39. As may be seen from viewing FIG. 4, the panels 37, 39, when the end gate is in its closed position, are disposed in overlapping relation to provide a seal for the gap between the forward edge 30a of the panel 30 and the rear edge 12a of the floor 12. Both panels 37, 39 are provided with recessed portions at their ends to permit the chains 25, 26 to pass.

The entire end gate is normally controlled in its arcuate movement by means of an elongated forwardly directed rod 40 connected at its rear end to an arm 41 fixed to the pivot 33 and the end gate. As is clearly evident, by moving the rod 40 rearwardly the end gate is swung upwardly and away from the floor 12 to provide a gap adjacent the rear edge 12a of the floor. By pulling the rod forwardly, the end gate is swung under the rotor 15 and the flexible rubber panels 37, 39 are swung into overlapping position as shown in FIGS. 1 and 4. The rod 40 may be controlled from the operator's station either at the forward end of the material container or on a tractor pulling the material unloader.

The type of end gate and sealing structure between the end gate and the floor of the conveyor is best used when hauling a liquid type manure or material. By closing the end gate in a position as shown in FIG. 4, the overlapping flexible panels 37, 39 will generally seal the rear end of the material container. There will, of course, be some loss of liquid or fluid at the ends or the recessed portions of the flexible panels 37, 39 which permit the chains 25, 26 to pass. Also, it should be understood that the present invention is considered to be usable while the rotor 15 is in operation and the end gate is in its closed position as shown in FIG. 4. The panels 37, 39 being rubber or flexible will yield upon the flights 27 passing over the sprockets 21, 22. Consequently as each flight moves over the end 12a of the floor 12, the panels 37, 39 will yield downwardly to permit passage thereof. However, upon the flights passing through the opening between the edges 30a and 12a, the flexible panels 37, 39 will immediately resume their overlapping position and will again seal the rear end of the container. There are, of course, times when it is desirable to completely open the end gate to a position shown in FIG. 2. This could be at the time the material is almost completely discharged and it is necessary to use the floor conveyor to move it to the rear end of the floor and yet there is not sufficient material for the widespread or rotor 15 to make contact therewith. Consequently the material will merely flow off the end of the floor 12. Also, at other times it is desirable to discharge material both through the gap at the lower edge of the end gate when it is in its open position and also by using the rotor. By positioning the pivot pins 33, 34 sufficiently rearwardly and downwardly relative to the rotor shaft 16, the upper edge of the end gate will never be higher than the axis of the shaft 16. Consequently the rotor structure 15 will at all times be capable of throwing or discharging material over the upper edge of the end gate. In this respect, it should be noted that the end gate is positioned spacedly rearwardly relative to the rotor 15 so as to permit material to pass between the arcuate panel 30 and the rotor at all times.

While only one form of the invention has been shown, it should be recognized that other forms and variations will occur to those skilled in the art. Therefore, while the present invention was shown and described in specific or detailed manner, it was not the intention in so doing to limit or narrow the invention beyond the broad concept set forth in the appended claims.

What is claimed is:

1. On a material unloader including a material container having a pair of upright sidewalls interconnected by a floor at their lower edges and open at one end for permitting discharge of material, a material distributing rotor at said open end supported on and extending between the side walls and a floor conveyor including a pair of transversely spaced sprockets at the edge of the floor, a pair of transversely spaced continuous chains extending over the sprockets and having upper runs above and lower runs below the floor, and a plurality of flight elements extending between the chains, the improvement comprising: a first transverse flexible panel fixed to the underside of the floor and extending beyond the edge thereof and within the path of movement of the flight elements as the chains pass over the sprockets, said flexible panel being capable of yielding to the pressure of the flight elements; an end gate including a transverse arcuate shaped panel having a lower edge adjacent the flexible panel and extending in an underlying position relative to the distributing rotor to an upper edge; upright side panels connected to opposite ends of the arcuate panel and defining substantial continuations of the container sidewalls; a second transverse flexible panel fixed to the arcuate panel adjacent its lower edge and extending beyond the latter edge toward the first flexible panel; means pivotally mounting the upright side panels to the sidewalls to permit the end gate structure to swing between a first position whereby said lower edge shall be disposed closely but spacedly from the floor edge and said first and second flexible panels shall overlap to normally seal the space between the lower edge and floor edge, and a second position whereby said lower edge is sufficiently spaced from said floor edge to eliminate the seal between the first and second flexible panels.

2. On a material unloader including a material container having a pair of upright sidewalls interconnected by a floor at their lower edges and open at one end for permitting discharge of material, a material distributing rotor at said open end supported on and extending between the side walls and a floor conveyor including a pair of transversely spaced sprockets at the edge of the floor, a pair of transversely spaced continuous chains extending over the sprockets and having upper runs above and lower runs below the floor, and a plurality of flight elements extending between the chains, the improvement comprising: a first transverse sealing element fixed to the floor adjacent the edge thereof and within the path of movement of the flight elements as the chains pass over the sprockets, said sealing element being capable of yielding to the pressure of the flight elements to permit passage thereof; an end gate including a transverse arcuate shaped panel having a lower edge adjacent the sealing element and extending in an underlying position relative to the distributing rotor to an upper edge; upright side panels connected to opposite ends of the arcuate panel and defining substantial continuations of the container sidewalls; a second transverse sealing element fixed to the arcuate panel adjacent its lower edge; means pivotally mounting the upright side panels to the sidewalls to permit the end gate structure to swing between a first position whereby said lower edge shall be disposed closely the floor edge and said first and second sealing elements shall effect a seal in the space between the lower edge and floor edge, and a second position whereby said lower edge is sufficiently spaced from said floor edge to eliminate the seal.

3. On a material unloader including a material container having a pair of upright sidewalls interconnected at their lower edges by a floor having a transverse edge at one end and open at said one end for permitting discharge of material, a material distributing rotor at said open end supported on and extending between the side walls and a floor conveyor including a pair of transversely spaced sprockets at the edge of the floor, a pair of transversely spaced continuous chains extending over the sprockets and having upper runs above and lower runs below the floor, and a plurality of transverse flight elements extending between the chains, the improvement comprising: a first transverse flexible panel fixed to the underside of the floor and extending beyond the edge thereof and within the path of movement of the flight elements as the chains pass over the sprockets, said flexible panel being capable of yielding to the pressure of the flight elements; a transverse end gate panel having a lower edge adjacent the flexible panel and extending in an underlying position relative to the distributing rotor to an upper edge; a second transverse flexible panel fixed to the arcuate panel adjacent its lower edge and extending beyond the latter edge toward the first flexible panel; means pivotally mounting the end gate panel to the sidewalls permitting the end gate panel to swing between a first position whereby said lower edge shall be disposed closely but spacedly from the floor edge and said first and second flexible panels shall overlap to normally seal the space between the lower edge and floor edge, and a second position whereby said lower edge is sufficiently spaced from said floor edge to eliminate the seal between the first and second flexible panels.

4. On a material unloader including a material container having a pair of upright sidewalls interconnected at their lower edges by a floor having a transverse edge at one end and open at said one end for permitting discharge of material, a material distributing rotor at said open end supported on and extending between the sidewalls and a floor conveyor including transversely spaced continuous chains having upper runs above and lower runs below the floor, and a plurality of transverse flight elements extending between the chains, the improvement comprising: a first transverse flexible panel fixed to the floor adjacent the edge and within the path of movement of the flight elements, said flexible panel being capable of yielding to the pressure of the flight elements; a transverse end gate panel having a lower edge adjacent the flexible panel and extending in an underlying position relative to the distributing rotor to an upper edge; a second transverse flexible panel fixed to the arcuate panel adjacent its lower edge and extending beyond the latter edge toward the first flexible panel; means pivotally mounting the end gate panel to the sidewalls permitting the end gate panel to swing between a first position whereby said lower edge shall be disposed closely but spacedly from the floor edge and said first and second flexible panels are in contact and operate to seal the space between the lower edge and floor edge, and a second position whereby said lower edge is sufficiently spaced from said floor edge to eliminate the seal between the first and second flexible panels.

5. On a material unloader including an elongated material container open at one end and having a pair of upright sidewalls interconnected at their lower edges by a floor having a transverse edge at the open end, a material distributing rotor at said open end supported on and extending between the side walls, and a floor conveyor including transversely spaced sprockets at the edge of the floor, transversely spaced continuous chains extending over the sprockets and having upper runs above and lower runs below the floor, and a plurality of transverse flight elements extending between the chains, the improvement comprising: a first transverse flexible panel fixed to the underside of the floor and extending beyond the edge thereof and within the path of movement of the flight elements as the chains pass over the sprockets, said flexible panels being capable of yielding to the pressure of the flight elements; an end gate attachment including a transverse arcuate shaped panel having a lower edge adjacent the flexible panel and extending in an underlying position relative to the distributing rotor to an upper edge; upright side panels connected to opposite ends of the arcuate panel and defining substantial continuations of the container sidewalls; a second transverse flexible panel fixed to the arcuate panel adjacent its lower edge and extending beyond the latter edge toward the first flexible panel; means adjacent said upper edge pivotally mounting the upright side panels to the sidewalls to permit the end gate structure to swing between a first position whereby said lower edge shall be disposed closely but spacedly from the floor edge and said first and second flexible panels shall overlap to normally seal the space between the lower edge and floor edge, and a second position whereby said lower edge is sufficiently spaced from said floor edge to eliminate the seal between the first and second flexible panels.

6. On a material unloader including an elongated material container open at its rear end and having a pair of upright sidewalls interconnected at their lower edges by a floor having a transverse rear edge, a material distributing rotor to said rear end supported on and extending between the side walls, and a floor conveyor including transversely spaced sprockets at the rear edge of the floor, transversely spaced continuous chains extending over the sprockets and having upper runs above and lower runs below the floor, and a plurality of transverse flight elements extending between the chains, the improvement comprising: an end gate attachment including a transverse arcuate shaped panel having a lower edge adjacent the rear edge of the floor and extending upwardly and rearwardly in an underlying position relative to the distributing rotor to an upper edge; upright side panels connected to opposite ends of the arcuate panel and defining substantial continuations of the container sidewalls; means mounting the upper forward portions of the upright side panels to pivot relative to the sidewalls about a transverse axis rearwardly and downwardly as respects the rotor axis to permit the end gate structure to swing between a first position whereby said lower edge shall be disposed closely relative to the floor edge and the upper edge is beneath the rotor axis whereby material is free to pass over the edge and out of the container, and a second position whereby said lower edge is sufficiently spaced from said floor edge to provide a relatively large material discharge between the lower and floor edges.

7. On a material unloader including a material container having a pair of upright sidewalls interconnected by a floor at their lower edges and open at one end for permitting discharge of material, the floor having a transverse terminal edge at the open end, a transverse material distributing rotor at the open end and above the floor, a floor conveyor including transversely spaced continuous chains having upper runs above and lower runs below the floor, and a plurality of flight elements extending between the chains, the improvement comprising: an end gate structure at the open end rearward of the rotor including a transverse upright panel having a lower edge adjacent the rear edge of the floor and an upper edge at the level of the rotor; upright side panels connected to opposite ends of the upright panel and defining substantial rearward continuations of the container side walls; a transverse flexible panel fixed to the end gate upright panel adjacent its lower edge and extending beyond the latter edge toward the floor; means pivotally mounting the upright side panels to the side walls to permit the end gate structure to be disposed rearwardly of the floor edge and to swing between a first position whereby said lower edge shall be disposed closely but spacedly from the floor edge so as to permit the flights to pass, said flexible panel and floor shall overlap to normally seal the space between the lower edge and floor edge, and the material is discharged over the upper edge by the rotor, and a second position whereby said lower edge is sufficiently spaced from said floor edge to eliminate the seal between the flexible panel and floor.

8. On a material unloader including a material container having a pair of upright sidewalls interconnected by a floor at their lower edges and open at one end for permitting discharge of material, a transverse material distributing rotor at the open end above the floor, a floor conveyor including transversely spaced continuous chains having upper runs above and lower runs below the floor, and a plurality of flight elements extending between the chains, the improvement comprising: an end gate attachment rearward of the rotor including a transverse upright panel having a lower edge adjacent the rear edge of the floor and an upper edge at the level of the rotor; upright side panels connected to opposite ends of the upright panel and defining substantial rearward continuations of the container sidewalls; a transverse flexible panel fixed to one of the edges and extending toward the other edge; means pivotally mounting the upright side panels to the sidewalls to permit the end gate structure to be supported rearwardly of the sidewalls and floor and to swing between a first position whereby said lower edge shall be disposed closely but spacedly rearwardly from the floor edge so as to permit the flights to pass, said flexible panel shall seal the space between the lower edge and floor edge, and the material is discharged over the upper edge by the rotor, and a second position whereby said lower edge is sufficiently spaced rearwardly from said floor edge to eliminate the seal between the flexible panel and floor.

9. On a material unloader including a material container having a pair of upright sidewalls interconnected by a floor at their lower edges and open at one end for permitting discharge of material, the floor having a transverse terminal edge at the open end, a transverse material distributing rotor at the open end above the floor, a floor conveyor including transversely spaced continuous chains having upper runs above and lower runs below the floor, and a plurality of flight elements extending between the chains, the improvement comprising: an endgate attachment disposed rearwardly of the rotor and including a transverse upright panel having a lower edge adjacent the floor edge at the open end of the container and an upper edge at the level of the rotor; a transverse flexible panel fixed to the end gate upright panel adjacent its lower edge and extending forwardly from the latter edge toward the floor; means mounting the upright panel on and rearwardly of the container to permit the end gate structure to swing between a first position whereby said lower edge shall be disposed closely but spacedly rearwardly from the floor so as to permit the flights to pass said flexible panel shall seal the space between the lower edge and floor edge, and the material is discharged over the upper edge by the rotor, and a second more rearward position whereby said lower edge is sufficiently spaced from said floor edge to eliminate the seal between the flexible panel and floor.

10. On a material unloader including an elongated material container open at its rear end and having a pair of upright sidewalls interconnected by a floor having a transverse rear edge, a material distributing rotor at the rear end to rotate about a fixed axis supported between the walls, and advancing means for moving material along the floor and rearwardly to the rotor, the improvement comprising: an end gate attachment including a transverse panel inclinedly disposed from a front lower edge adjacent the rear edge of the floor upwardly and rearwardly and in an underlying position relative to the rear under side of the rotor to an upper edge rearwardly of and beneath the rotor axis; vertical side structure connected to opposite ends of the panel and substantially in rear alignment with the sidewalls; and means mounting the side structure on the sidewalls to pivot about a fixed transverse axis downwardly and rearwardly relative to the rotor axis and to extend rearwardly and downwardly from the axis and to permit the end gate structure to swing between positions whereby the lower edge is closely adjacent to and considerably rearwardly of the floor edge.

11. On a material unloader including an elongated material container open at its rear end and having a pair of upright sidewalls interconnected by a floor having a transverse rear edge, a material distributing rotor at the rear end to rotate about a fixed axis supported between the walls, and advancing means for moving material along the floor and rearwardly to the rotor, the improvement comprising: an end gate attachment including a transverse panel inclinedly disposed from a front lower edge adjacent the rear edge of the floor upwardly and rearwardly to an upper rear edge rearwardly of the rotor and beneath the rotor axis whereby material may be discharged over the edge by the rotor; vertical side structure connected to opposite ends of the panel and substantially in rear alignment with the sidewalls; means mounting the side structure to pivot about a fixed axis rearwardly and downwardly in respect to the rotor axis and to permit the end gate structure to swing between positions whereby the lower edge is closely adjacent to and considerably rearwardly of the floor edge while retaining the upper edge beneath the rotor axis; a fore-and-aft extending control element operatively associated at its rear end to the gate attachment for effecting movement of the attachment in a fore-and-aft direction and extending forwardly from its rear end alongside a sidewall; and means on the sidewall supporting the control element for fore-and-aft movement.

12. On a material unloader including a material container having a pair of upright sidewalls interconnected by a floor at their lower edges and open at one end for permitting discharge of material, the floor having a transverse edge at the open end, a floor conveyor means for moving material to the open rear end, and a material distributing rotor at the open end above the floor, the improvement comprising: an end gate attachment rearward of the rotor including a transverse upright panel having a lower edge adjacent the rear edge of the floor and an upper edge at the level of the rotor and upright side structure disposed adjacent the respective sidewalls connected to opposite ends of the upright panel; means pivotally mounting the side structures to the sidewalls to permit the end gate attachment to swing between a first position whereby said lower edge is closely adjacent the edge of the floor and material may be discharged over the upper edge by the rotor, and the second position in which the lower edge is spaced from the floor edge to provide an open gap to permit material to pass.

13. On a material unloader including a material container having a pair of upright sidewalls interconnected by a floor at their lower edges and open at one end for permitting discharge of material, the floor having a transverse edge at the open end, a floor conveyor means for moving material to the open rear end; and a material distributing rotor at the open end above the floor, the improvement comprising: an end gate attachment rearward of the rotor including a transverse upright panel having a lower edge adjacent the rear edge of the floor and an upper edge at the level of the rotor and upright side structure disposed adjacent the respective sidewalls connected to opposite ends of the upright panel; means pivotally mounting the side structures to the sidewalls to permit the end gate attachment to swing between a first position whereby said lower edge is closely adjacent the edge of the floor and material may be discharged over the upper edge by the rotor, and a second position in which the lower edge is spaced from the floor edge to provide an open gap to permit material to pass; and control means on a sidewall effecting the angular movement of the gate attachment about its pivotal mounting means.

14. On a material unloader including a material container having a pair of upright sidewalls interconnected by a floor at their lower edges and open at one end for permitting discharge of material, the floor having a transverse edge at the open end, a floor conveyor means for moving material to the open rear end, and a material distributing rotor at the open end above the floor, the improvement comprising: an end gate attachment rearward of the rotor including a transverse upright panel having a lower edge adjacent the rear edge of the floor and an upper edge at the level of the rotor and upright side structure disposed adjacent the respective sidewalls connected to opposite ends of the upright panel; means pivotally mounting the side structures to the sidewalls to permit the end gate attachment to swing between a first position whereby said lower edge is closely adjacent the edge of the floor and material may be discharged over the upper edge by the rotor, and a second position in which the lower edge is spaced from the floor edge to provide an open gap to permit material to pass; and control means on a sidewall effecting the angular movement of the gate attachment about its pivotal mounting means including a longitudinally extending control element supported on the respective sidewall for longitudinal movement, and connecting means between the element and gate attachment whereby the gate attachment will move angularly in response to longitudinal adjustment of the element.

References Cited by the Examiner

UNITED STATES PATENTS

| | | | |
|---|---|---|---|
| 1,960,596 | 5/34 | Rimple | 275—5 X |
| 2,375,063 | 5/45 | Andershock | 296—56 |
| 2,692,067 | 10/54 | Hapman | 222—342 X |
| 2,830,746 | 4/58 | Sweet | 222—556 X |
| 3,011,793 | 12/61 | McElhinney et al. | 275—6 X |
| 3,063,723 | 11/62 | Toft | 275—5 |
| 3,096,892 | 7/63 | Smith | 214—83.18 |

LOUIS J. DEMBO, *Primary Examiner.*

RAPHAEL M. LUPO, *Examiner.*